United States Patent [19]

Suzuki

[11] Patent Number: 5,014,804

[45] Date of Patent: May 14, 1991

[54] CONSTANT-SPEED TRAVELING EQUIPMENT

[75] Inventor: Fujiyuki Suzuki, Shizuoka, Japan

[73] Assignee: Suzuki Jidosha Kogyo Kabushiki Kaisha, Shizuoka, Japan

[21] Appl. No.: 345,469

[22] Filed: Apr. 28, 1989

[30] Foreign Application Priority Data

May 19, 1988 [JP] Japan .................................. 63-122766

[51] Int. Cl.$^5$ .............................................. B60K 31/02
[52] U.S. Cl. ...................................... 180/178; 123/350
[58] Field of Search ............... 180/170, 178, 179, 175, 180/176; 123/319, 349, 350

[56] References Cited

U.S. PATENT DOCUMENTS 4,234,051 11/1980 Morris, Jr. ........................... 180/178

FOREIGN PATENT DOCUMENTS 0287830 12/1986 Japan .................................... 180/170

Primary Examiner—Andres Kashnikow
Assistant Examiner—Richard Camby
Attorney, Agent, or Firm—Flynn, Thiel, Boutell & Tanis

[57] ABSTRACT

A cruise control apparatus includes an actuator adapted to cooperate with an accelerator to open and close an intake throttle valve to a specified opening position, and to prevent the throttle valve from returning to a fully closed position to thereby maintain a selected vehicle speed. A control unit is provided to control the actuator so that movement of the throttle valve to a fully closed position is retarded for a predetermined time period after disengaging the cruise control function. The control unit controls the actuator so as to permit free movement of the throttle valve toward the fully closed position after the predetermined time period.

1 Claim, 3 Drawing Sheets

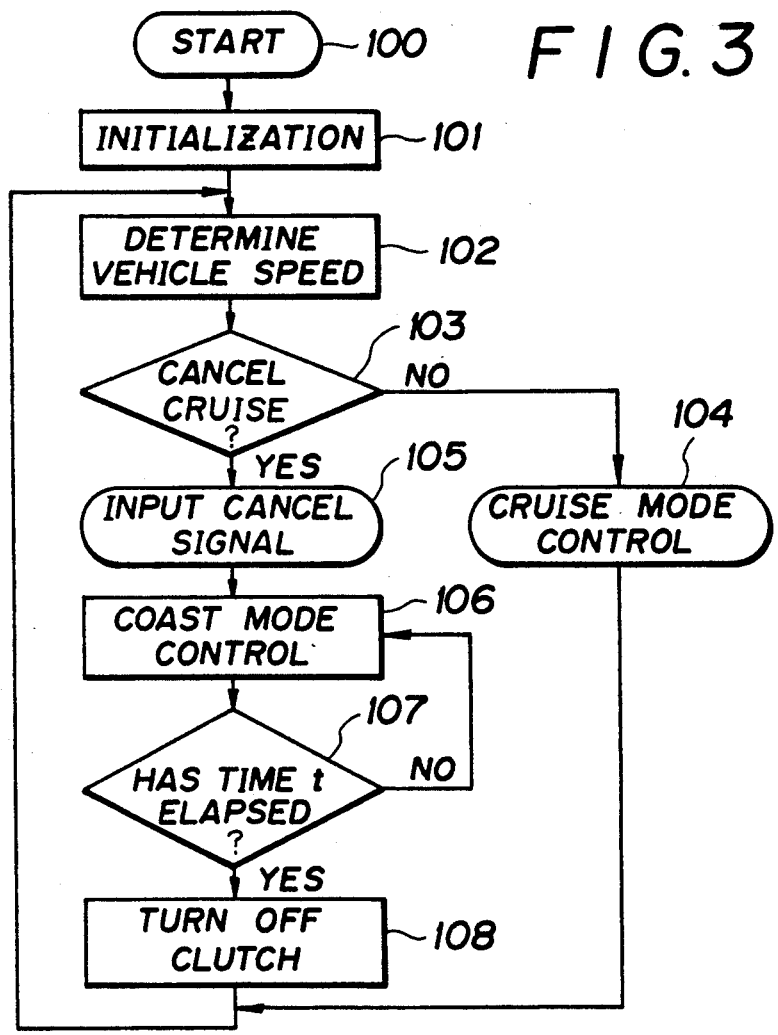
FIG. 3
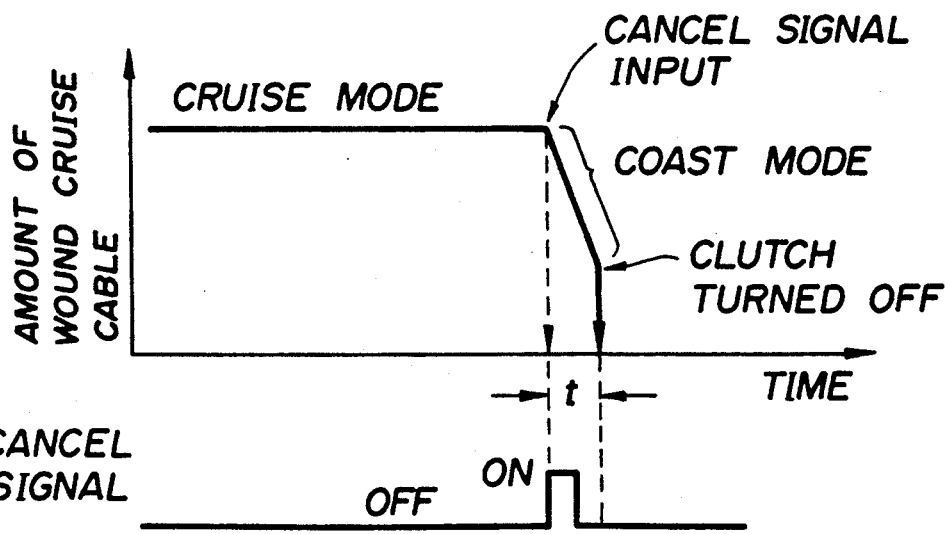
FIG. 4(a)
FIG. 4(b)

CONSTANT-SPEED TRAVELING EQUIPMENT

FIELD OF THE INVENTION

This invention relates to a vehicle constant-speed control apparatus for housed objects, especially to constant-speed traveling equipment capable of decreasing impact noises produced by the accelerator due to the operation of the intake throttle valve returning to the fully closed position.

BACKGROUND OF THE INVENTION

A constant-speed control apparatus for maintaining a set vehicle speed without operating the accelerator pedal is disclosed as TOKKAISHO-61-271132 in the Japanese Official Gazette. The equipment in the gazette shows a structure which can be installed on a vehicle having no constant-speed equipment without rebuilding the accelerator and the intake throttle valve of the vehicle.

The constant-speed apparatus includes the type having an actuator cooperable with the accelerator to open/close the intake throttle valve up to a specified opening position and prevent the valve from returning to its fully closed position to maintain the set vehicle speed.

In the above constant-speed (or cruise control) apparatus, however, when the constant-speed control is disengaged, the depressed accelerator pedal is quickly returned to its fully extended position by the accelerator-pedal return spring, and the intake throttle valve is quickly returned to its fully closed position. This occurs because, when the constant speed control apparatus is disengaged, prevention of the intake throttle valve from returning to the fully closed position is immediately cancelled. Therefore, the accelerator lever impacts with a stopper with a large force and produces a large impact noise, causing the operator to feel uncomfortable. There is also the disadvantage that the service life of the constant-speed apparatus is shortened because the above quick return operation causes a large reaction force to be transmitted to the drive installed on the actuator which controls the opening/closing of the intake throttle valve.

In addition, a cushion is conventionally installed to decrease impact noise. However, the noise is not adequately decreased by the cushion and the cost is increased due to increase of components.

Therefore, one purpose of the invention is to provide a constant-speed (or cruise control) apparatus having an actuator cooperable with the accelerator to open/close the intake throttle valve up to the specified opening position to maintain the set vehicle speed, which apparatus is capable of decreasing impact noise produced by the accelerator due to the rapid return of the intake throttle valve to the fully closed position (and the corresponding rapid return of the accelerator lever and its impact with a stopper) when control of the set vehicle speed is cancelled.

Another object of the present invention is to provide a cruise control apparatus, as aforesaid, which is also capable of an increased service life while avoiding an increase in cost.

SUMMARY OF THE INVENTION

To accomplish the above purpose, this invention relates to a vehicle constant-speed control apparatus having an actuator cooperable with the accelerator to open/close the intake throttle valve up to a specified opening posi10 tion and maintain the throttle valve at the specified position to maintain the set vehicle speed, including a system to control the actuator so that movement of the throttle valve toward its fully closed position is retarded or damped for a predetermined amount of time after the vehicle speed control is disengaged. After the predetermined time period, the throttle valve is permitted to move freely toward the fully closed position.

The control system in this invention makes it possible to decrease the collision force of the accelerator components by controlling the actuator so that movement of the throttle valve from toward the fully closed position is retarded or damped for a predetermined amount of time after the vehicle speed control is disengaged. After the predetermined time period, the throttle valve is permitted to move freely toward the fully closed position.

BRIEF DESCRIPTION OF THE DRAWINGS

An exemplary embodiment will be described in detail below in connection with the drawings, in which:

FIG. 3 is a flow chart showing the operational procedure of the present invention;

FIGS. 4(a) and 4(b) show the timing relationship between the cruise control cancel signal and the amount of cruise cable wound on the actuator;

DETAILED DESCRIPTION

The following describes a preferred embodiment of the invention according to the drawings.

Figure 1:
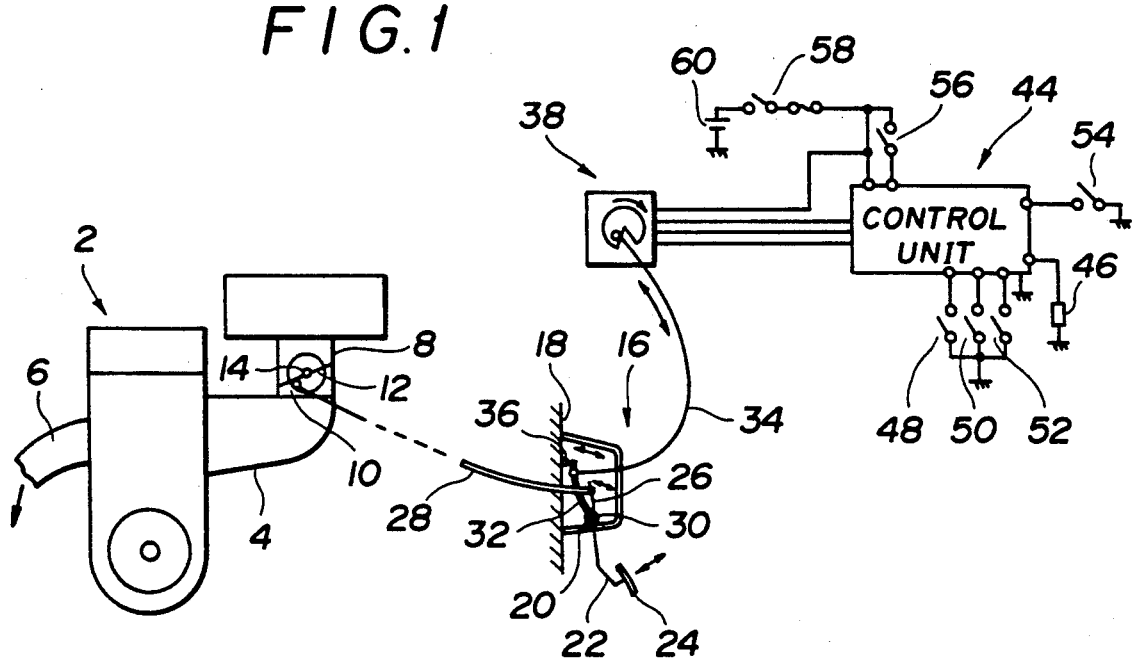
FIG. 1 shows a schematic representation of the vehicle constant-speed control apparatus.

FIGS. 1 through 8 show the preferred embodiment of the invention. In FIG. 1, 2 shows an internal combustion engine for vehicles, 4 an intake manifold, and 6 an exhaust manifold.

An intake throttle valve 12 is set to the intake path 10 of a carburetor 8 installed on the upstream side of the intake manifold 4 so that the valve 12 can be rotated around a valve shaft 14.

Figure 6:
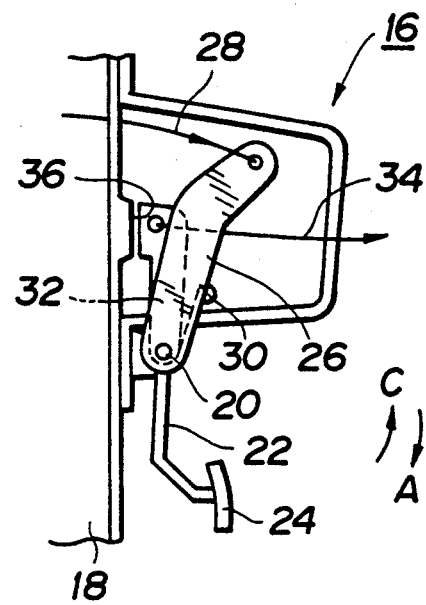
Figure 7:
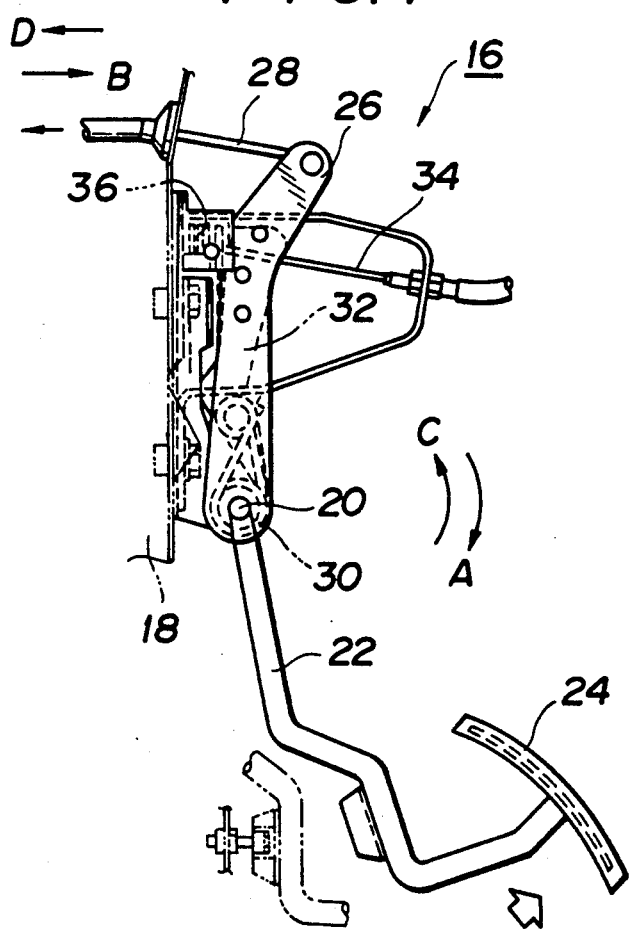
FIGS. 7 and 8 are side and front views, respectively, of the accelerator.
Figure 8:
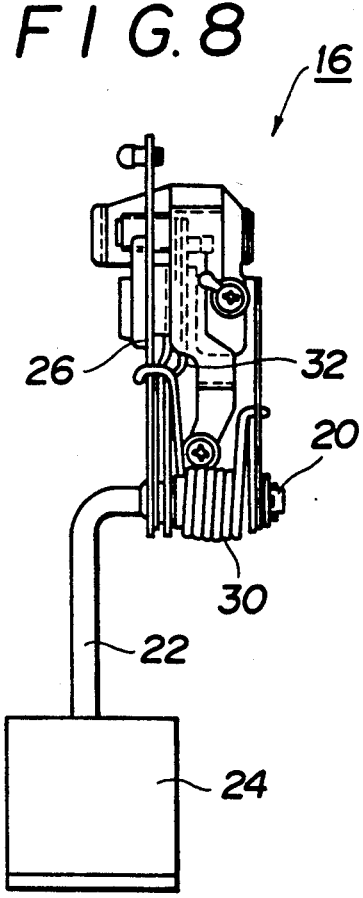

The intake throttle valve 12 is opened or closed by an accelerator 16 in which one end of an accelerator arm 22 is secured at an accelerator shaft 20 and supported by the shaft at a body side 18 as shown in FIGS. 7 and 8. An accelerator pedal 24 is secured at the other end of the accelerator arm 22. One end of an accelerator lever 26 is pivotally secured at the shaft 20. One end of an accelerator cable 28 is secured at the free end of the accelerator lever 26. The other end of the accelerator cable 28 is secured at the intake throttle valve 12 at a location spaced from the shaft 14 (FIG. 1). The accelerator shaft 20 is equipped with an accelerator return spring 30 (FIGS. 5-8) to urge the accelerator arm 22 and the accelerator lever 26 toward a rest position as described below.

Therefore, when stepping on (or depressing) the accelerator pedal 24 against the accelerator return spring 30 in the direction of the arrow A (FIGS. 5-7), the accelerator lever 26 pivots in the direction of the arrow A to pull the accelerator cable 28 in the direction of the arrow B. When the accelerator cable 28 is pulled in the direction of the arrow B, the intake throttle valve 12 is opened from the fully closed position shown in FIG. 1.

Meanwhile, when the accelerator pedal 24 is released, it is forced by the return spring 30 to move in the direction of the arrow C (FIGS. 5-7) toward its extended position. Consequently, the accelerator lever 26, by the action of the accelerator return spring 30, pivots in the direction of the arrow C to return the accelerator cable 28 in the direction of the arrow D. When the accelerator cable 28 is returned in the direction of the arrow D, the intake throttle valve 12 is closed toward the fully closed position shown in FIG. 1. Thus, the intake throttle valve 12 is opened or closed by the accelerator 16.

One end of a cruise lever 32 of the constant-speed traveling equipment is pivotally secured at the accelerator shaft 20 of the accelerator 16 (FIGS. 5-8). One end of a cruise cable 34 is secured at the free end of the cruise lever 32. The other end of the cruise wire 34 is connected to an actuator 38 (FIG. 1). The actuator 38 is equipped with a driving motor 40 (FIG. 2) working as a drive to wind and unwind the cruise cable 34, and an inhibiting electromagnetic clutch 42 working as an inhibitor.

Figure 5:
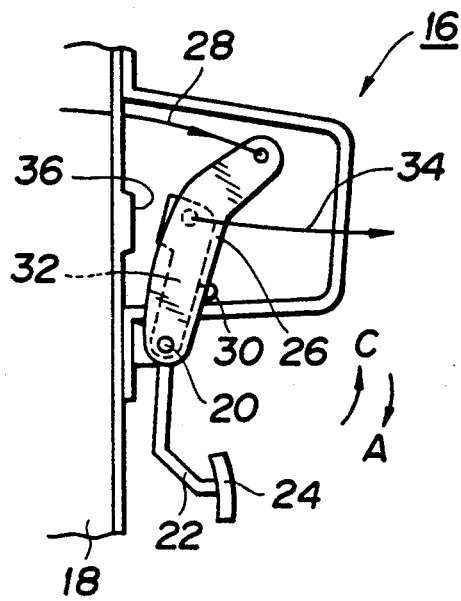
FIGS. 5 and 6 show the operation of a vehicle accelerator with cruise control respectively engaged and disengaged.

Thus, as seen from FIGS. 1 and 5, when cruise control is engaged, the cruise lever 32 is pulled by the cruise cable 34 as it is wound up on the actuator 38, causing the cruise lever 32 to engage the accelerator lever 26 and cause it to pivot in the direction of the arrow A. Of course, if the cruise cable 34 is unwound from the actuator 38, the return spring 30 forces the accelerator lever 26 and cruise lever 32 to pivot in the direction C. As shown in FIG. 6, the lever 32 contacts a stopper 36 installed at the body side 18 when cruise control is disengaged.

When the accelerator pedal is released, the return spring 30 holds the accelerator lever 26 at a rest position, contacting the stopper 36 through the cruise lever 32.

The driving motor 40 opens or closes the intake throttle valve 12 up to a specified opening position through the accelerator 16 by winding or unwinding the above cruise cable 34. The inhibiting electromagnetic clutch 42 inhibits the intake throttle valve 12 from returning to the fully closed position through the accelerator 16 by inhibiting the unwinding of the above cruise cable 34.

The actuator 38, including the driving motor 40 and the inhibiting electromagnetic clutch 42, opens/closes the intake throttle valve 12 up to a specified opening position through the accelerator lever 26 and the accelerator cable 28 of the accelerator 16 by winding/unwinding the cruise cable 34 to operate the cruise lever 32 secured at one end of the cruise cable 34. The actuator 38 also inhibits the intake throttle valve 12 from returning to the fully closed position through the accelerator 16 by inhibiting the unwinding of the cruise cable 34 as mentioned above.

A control unit 44 is connected to the actuator 38 and outputs a control signal to the actuator 38 to control the actuator 38 so that movement of the intake throttle valve 12 toward the fully closed position is retarded or damped for a predetermined amount of time after the vehicle speed control is disengaged. After the predetermined time period, the throttle valve is permitted to move freely toward the fully closed position.

In other words, for a predetermined time after cruise control is disengaged, the actuator 38 retards or damps movement of the accelerator lever 26 towards its rest position against the stopper 36, which in turn retards movement of the valve 12 toward its fully closed position. The control unit 44 controls this damping at the time of cruise control disengagement by engaging the clutch 42 to cause the motor 40, also controlled by the control unit, to unwind the cruise cable 34 at a rate that does not allow the cruise lever 32 (and acceleration lever 26 engaged therewith) to move freely as urged by the return spring 30. Thus, the force (in direction D of FIG. 7) exerted by the return spring 30 on the accelerator lever 26 and engaged cruise lever 32 is damped by the oppositely directed force (direction B) exerted on the cruise lever 32 by the unwinding cruise cable 34. This damping continues for a predetermined time period after cruise control disengagement (FIG. 4a), and is then removed, allowing the motor 40 to unwind the cable 34 at its normal rate.

Figure 2:
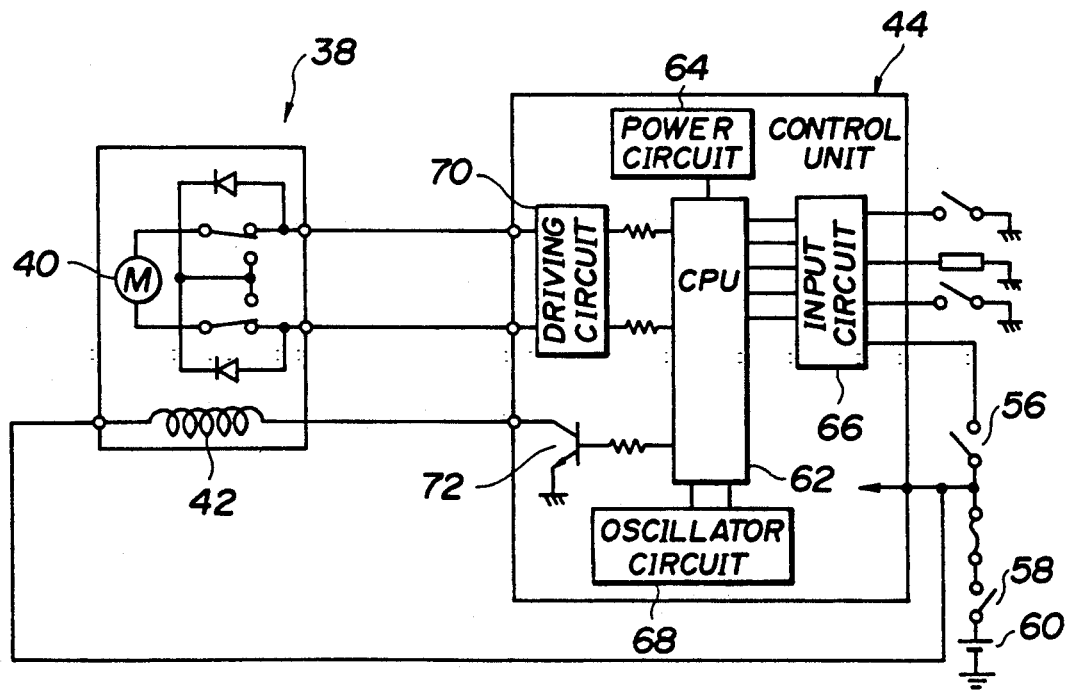
FIG. 2 is a circuit diagram of a part of the constant-speed control apparatus shown in FIG. 1.

As shown in FIGS. 1 and 2, the control unit 44 is connected to a group of command switches including a vehicle speed sensor 46, resuming accelerator switch 48, set coast switch 50, and cancel switch 52, and the brake switch 54 and clutch switch 56 (inhibitor switch for the vehicle mounting an automatic transmission). The control unit 44 is also equipped with a CPU 62, power circuit 64, input circuit 66, oscillator circuit 68, driving circuit 70 for the driving motor 40, and driving transistor 72 for switching electric current from a battery 60 through the inhibiting electromagnetic clutch 42. An ignition switch 58 and the battery 60 are used to supply power to the control unit 44.

The following describes the action according to FIGS. 3 and 4. When control starts (step 100), the initialization (step 101) is made. The vehicle speed calculation (step 102) is made according to the signal input from the vehicle speed sensor 46. At step 103, the command input from the group of command switches is determined.

If the command signal to maintain the set vehicle speed is input in the decision for the step 103, the cruise mode traveling (step 104) is controlled to return the control to the step 102. Meanwhile, if the command signal to cancel the vehicle speed control is input in the above step 103, input of the cancel signal (step 105 and FIG. 4b) is controlled.

Step 103 is thus primarily concerned with determining whether cruise control has been cancelled. If so, the coast mode control processing step 106, as shown in FIG. 4, turns on the driving motor 40 and the inhibiting electromagnetic clutch 42 of the actuator 38 to cooperate with the accelerator 16 to permit damped or retarded movement of the intake throttle valve 12 toward its fully closed position. By the above operation, the cruise cable 34 is slowly unwound against the accelerator return spring 30 in the direction of the arrow D (FIG. 7) and the cruise lever 32 slowly pivots in the direction of the arrow C together with the accelerator lever 26. The coast mode control processing (step 106) continues until the specified time t elapses (step 107). After the specified time t is over (step 107), the inhibiting electromagnetic clutch is turned off (step 108) to stop damping the movement of the intake throttle valve toward the fully closed position. Thereafter, the program returns to the step 102.

When the damping is cancelled, the cruise cable 34 is unwound in the direction of the arrow D, the cruise lever 32 and accelerator lever 26 quickly pivot in the direction of the arrow C (due to the return spring 30), and the accelerator lever 26 contacts the stopper 36 through the cruise lever 32. In this case, the impact force between the accelerator lever 26 and the stopper 36 can be decreased because the accelerator lever 26, along with the cruise lever 32, slowly approaches the stopper 36 until the specified time t elapses after the cancel signal is input.

Therefore, it is possible to decrease the impact noises produced by the accelerator 16. Also because the collision force can be decreased, it is possible to decrease the reaction force transmitted to the driving motor (the drive) 40 installed on the actuator 38 which controls the opening/closing of the intake throttle valve 12. Such a reduction in reaction force will lengthen the service life of the constant-speed control apparatus.

In addition to the above, because no cushion is required to reduce impact noise and only a change of the software for the control unit 44 is needed, it is possible to avoid increasing the cost for the constant-speed control apparatus.

The invention causes the impact force of the accelerator components to be decreased by controlling the actuator with the control unit so that movement of the throttle valve toward the fully closed position is retarded or damped for a predetermined amount of time after the vehicle speed control is disengaged. After the predetermined time period, the throttle valve is permitted to move freely toward the fully closed position. This decreases the impact noise produced by the accelerator. In addition, the service life of the constant-speed control apparatus can be lengthened by decreasing the force transmitted to the drive installed on the actuator which controls the opening/closing of the intake throttle valve. Moreover, because no cushion is required and only a change of the software for the control unit is needed, it is possible to avoid increasing the cost of the constant-speed control apparatus.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A vehicle cruise control apparatus for use with an accelerator having an acceleeator lever operatively connected to a throttle valve and to a return spring for urging the accelerator lever twoard a rest position corresponding to a closed throttle valve position, comprising:

control means for moving the accelerator lever to and maintaining it at a jplruality of cruise positions corresponding to vehicle cruise speeds;

switching means for engaging and disengaging said control means; and damping means for positively applying to said accelerator lever a damping force which damps closing mvoement of the accelerator lever while said accelerator lever is simultaneously being moved by the return spring from a respective said cruise position twoard said rest position, said damping means being responsive to said switching means and operable for a predetermined period of time after said control means is disengaged.

* * * * *

UNITED STATES PATENT AND TRADEMARK OFFICE
CERTIFICATE OF CORRECTION

PATENT NO. : 5,014,804
DATED : May 14, 1991
INVENTOR(S) : Fujiyuki SUZUKI

It is certified that error appears in the above-identified patent and that said Letters Patent is hereby corrected as shown below:

Column 6, line 16; change "acceleerator" to ---accelerator---.

Column 6, line 18; change "twoard" to ---toward---.

Column 6, line 22; change "jplruality" to ---plurality---.

Column 6, line 28; change "mvoement" to ---movement---.

Column 6, line 31; change "twoard" to ---toward---.

Signed and Sealed this

Second Day of March, 1993

*Attest:*

STEPHEN G. KUNIN

*Attesting Officer*    *Acting Commissioner of Patents and Trademarks*